Nov. 11, 1924.  
M. SZPAK  
1,515,287  
TIRE PROTECTOR AND ANTISKID DEVICE  
Filed Nov. 22, 1923
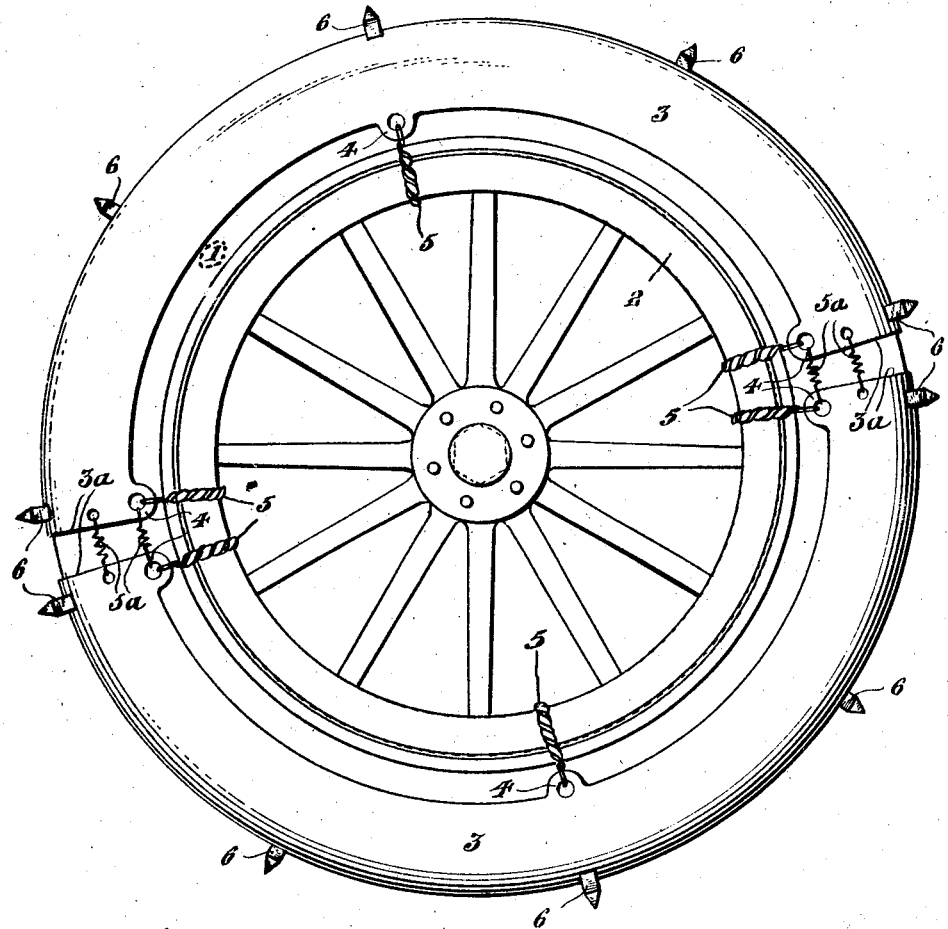
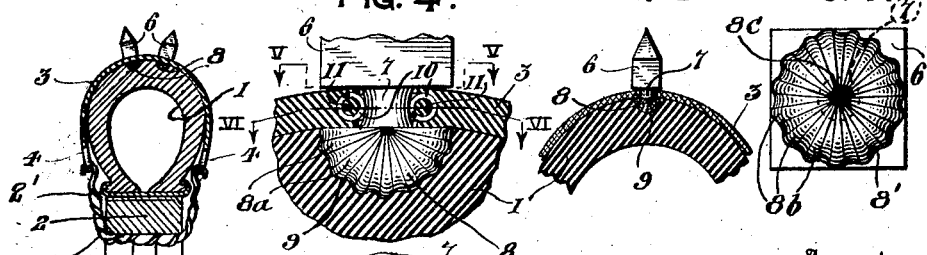
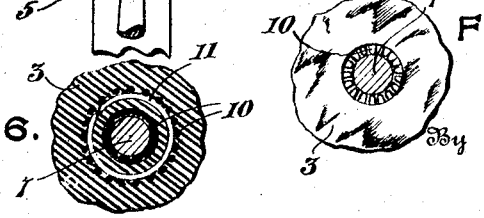

Patented Nov. 11, 1924.

1,515,287

UNITED STATES PATENT OFFICE.

MIKOLA SZPAK, OF WOONSOCKET, RHODE ISLAND.

TIRE PROTECTOR AND ANTISKID DEVICE.

Application filed November 22, 1923. Serial No. 676,393.

*To all whom it may concern:*

Be it known that I, MIKOLA SZPAK, a citizen of Ukraine, residing at Woonsocket, in the county of Providence and State of Rhode Island, have invented certain new and useful Improvements in Tire Protectors and Antiskid Devices, of which the following is a specification.

This invention relates to new and useful improvements in combined tire protectors and anti-skid devices.

An important object of the invention is to provide a protector for a tire casing tread which may be quickly and easily applied thereto.

A further object of the invention is to provide a protector of the above noted type with removable elements which project radially outwardly therefrom and act as anti-skid devices for increasing the traction ability of the tire.

A still further object of the invention is to provide improved means for removably securing the anti-skid elements to the protector and for associating the said anti-skid elements with the tread of the tire casing.

Other objects and advantages of the invention will be apparent during the course of the following description.

In the accompanying drawing forming a part of this specification and in which like numerals are employed to designate like parts throughout the same, Figure 1 is a side elevational view illustrating a wheel and tire with the tire protector and anti-skid device operatively mounted thereon, Figure 2 is a cross-sectional view showing the protector secured to the tire and wheel supporting the same with the anti-skid elements projecting outwardly therefrom, Figure 3 is a detail sectional view showing the manner of associating the inner projecting end of the anti-skid elements with the tread of the tire casing, Figure 4 is a fragmentary enlarged sectional view illustrating the detail features of construction possessed by the anti-skid elements and the portion of the protector associated therewith and the manner of associating the said anti-skid elements with the tire casing tread, Figure 5 is a fragmentary sectional view taken upon line V—V of Fig. 4, Figure 6 is a fragmentary sectional view taken upon line VI—VI of Fig. 4, and Figure 7 is a bottom plan view of a modified form of anti-skid element.

In the drawing, wherein for the purpose of illustration is shown a preferred embodiment of this invention, the combined protector and anti-skid device is illustrated as operatively mounted upon an automobile wheel wherein the reference numeral 1 designates the tire casing which is mounted upon the wheel rim 2'. The protector is formed of sections 3 which act as a sheath for enclosing the tire casing 1 and are constructed of any suitable flexible material, such as leather, rubber, or canvas and substantially completely encircle the tread surface and outer side walls of the tire casing 1. To retain the protecting sheath in position upon the tire casing, the inner edges of the said sections are provided with apertured extensions 4 with which tie devices 5 such as cords or chains are associated, the said tie devices passing around the felly 2 for anchoring the sheath in position as shown in Fig. 2. The adjacent ends 3ª of the sheath sections 3 are connected together by means of the resilient tie elements 5ª which are preferably in the form of coiled spring sections, or the like.

The sheath sections 3 are provided with suitably spaced apertures formed in the portion of the same that overlies the tread of the tire casing 1 and the said apertures are adapted for receiving the anti-skid elements which, in this particular showing, are the metallic spurs 6. The said spurs 6 are provided with reduced neck portions 7 which carry at their inner ends enlarged, substantially semi-spherical, inwardly directed heads 8, as illustrated. It will be seen by this construction, that the enlarged heads 8 are intended to be forced through the apertures formed in the sheath sections 3 and the reduced neck portions will thereby be positioned within the said apertures and the outwardly and inwardly projecting portions, the bodies of the spurs and the enlarged heads respectively, will tend to retain the said spurs in their respective apertures.

With the protector and anti-skid device in position upon a tire casing, the latter being usually provided with a rough tread in the form of depressions and projections, the enlarged heads 8 of the spurs 6 will interlock with the depressions and projections, to prevent creeping movement of the sheath upon the tread of the tire 1, and where a smooth tread tire is employed, the heads 8 will sink into the tread, as at 9, or depressions may be provided therefor to hold the sheath in position on the tire.

It will be noted that should any of the spurs 6 become damaged or worn out, the same may be readily removed from the sheath and new ones inserted in lieu thereof, merely by disengaging the head 8 from the spur 6 as by breaking or sawing off, as will be apparent to those skilled in the art. For the purpose of reinforcing the walls of the apertures formed in the sheath sections 3, there is illustrated in detail in Figs. 4 to 6 inclusive a manner of accomplishing this purpose. It is intended, in forming the sheath sections 3 from molded material, such as rubber or plastic fibrous material, to embed in the wall of each aperture a ring 10 which is formed by a continuous coil spring. It will be seen that this spring ring 10 has a portion of each convolution projecting inwardly or within the said aperture and exposed to view. There is also provided a split ring 11 which is formed from a single strand of wire and is embedded in the sheath section within the bore of the coil ring 10 and substantially in engagement and traversing the embedded portions of each convolution of the said ring 10. It will be noted, by inspecting Fig. 6, that both of the rings 10 and 11 are concentrically arranged in respect to the apertures in the sheath sections. It will be seen, by this construction, that the reduced neck portion 7 of each spur 6 engages the exposed portions of the convolutions of the coil ring 10 and the said neck is thereby provided with a metallic seat. The particular formations of the rings 10 and 11 will, however, give or flex a sufficient amount to permit the enlarged head 8 of the spur to be forced through the aperture. The reinforcement for the said apertures will prevent the same from becoming enlarged, due to wear and will greatly aid in retaining the said spurs in their proper apertures.

For the purpose of preventing the spurs from fulcruming at their point of connection with the sheath sections 3, the outer surface of the semi-spherical head 8, shown in Fig. 4, is provided with corrugations 8$^a$ which extend circumferentially around the said head, as illustrated. In Fig. 7, there is shown a spur 6 having an enlarged head 8' which is provided with corrugations 8$^b$ which extend radially outwardly from the axis of the spur, designated by the numeral 8$^c$. It will be seen, by considering the formations of the heads illustrated in Figs. 4 and 7, that the same will not only frictionally engage the depressions formed in the tread portion of the tire casing 1, but will also form corrugations which will cooperate with the said corrugations 8$^a$ or 8$^b$ for preventing all shifting of the said heads in respect to the tire casing 1.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In a combined tire protector and anti-skid device, a flexible sheath having a series of suitably spaced apertures and adapted to enclose the tread portion of a tire casing, means for connecting said sheath to the wheel, reinforcing means carried by the walls of said apertures formed in the flexible sheath, and anti-skid devices embodying a plurality of spurs, each having a reduced neck intermediate its ends and adapted to be connected to said sheath by forcing the inner end through one of said reinforced apertures.

2. In a combined tire protector and anti-skid device, a sheath made of flexible material having a series of suitably spaced apertures and adapted to enclose the tread portion of a tire casing, means for connecting said sheath to the wheel, metallic reinforcing means partially embedded in the walls of said apertures, and anti-skid devices embodying a plurality of spurs, each having a reduced neck intermediate its ends, and adapted to be connected to said sheath by forcing the inner end through one of said reinforced apertures until the reduced neck engages the exposed portion of the reinforcing means.

3. In a combined tire protector and anti-skid device, a flexible sheath having a series of suitably spaced apertures and adapted to enclose the tread portion of a tire casing, means for connecting said sheath to the wheel, reinforcing means carried by the walls of said apertures formed in the flexible sheaths, and anti-skid devices embodying a plurality of spurs, each having a reduced neck portion and an enlarged semi-spherical head at its inner end which is provided with a roughened outer surface, said spurs being adapted to be connected to said sheath by forcing the enlarged heads through the reinforced apertures in the sheath.

4. In a combined tire protector and anti-skid device, a sectional flexible sheath having a series of suitably spaced apertures and adapted to enclose the tread portion of a tire casing, means for connecting said sheath to the wheel, metallic reinforcing means for the apertures formed in said flexible sheath, and anti-skid devices embodying a plurality of spurs, each having a reduced neck intermediate its ends and adapted to be connected to said sheath with the said reduced neck positioned within one of said apertures, said reinforcing means for the apertures consisting of a ring formed from a continuous coil of wire partially embedded in the wall of the aperture and having a portion of each convolution projecting into said aperture.

5. In a combined tire protector and anti-skid device, the combination with a tire casing having a series of suitably spaced semi-spherical depressions formed in its tread portion, of a flexible sheath adapted to enclose the tread portion of the tire and having a series of suitably spaced apertures which are adapted to aline with the depressions formed in the tire tread, and anti-skid devices embodying a plurality of spurs each having a reduced neck intermediate its ends and an enlarged semi-spherical head at its inner end which is provided with a corrugated outer surface, said spurs being adapted to be connected to said sheath with the reduced neck portions positioned within the apertures in the sheath and with the enlarged head portions seated within the depressions formed in the tire tread.

In testimony whereof I affix my signature.

MIKOLA SZPAK.